United States Patent [19]

Bensel, III et al.

[11] Patent Number: 4,927,227
[45] Date of Patent: May 22, 1990

[54] OPTICAL FIBER CABLE CLOSURE

[75] Inventors: William H. Bensel, III, Lawrenceville; Robert H. Gladden, Jr., Norcross; John F. Malluck, Marietta; Robert R. Ross, Gainsville; Andrew H. Williamson, Jr., Doraville, all of Ga.

[73] Assignee: AT&T Bell Laboratories, Murray Hill, N.J.

[21] Appl. No.: 264,606

[22] Filed: Oct. 31, 1988

[51] Int. Cl.⁵ ............................ G02B 6/36; G02B 7/26
[52] U.S. Cl. .................................................. 350/96.20
[58] Field of Search ................. 350/96.20, 96.21, 96.22

[56] References Cited

U.S. PATENT DOCUMENTS 4,752,110 6/1988 Blanchet et al. ................. 350/96.20

OTHER PUBLICATIONS

RAYCHEM article dated Aug. 1986, entitled "FOSC 100 ® Fiber Optic Splice Closure System".

Primary Examiner—William L. Sikes
Assistant Examiner—Robert E. Wise
Attorney, Agent, or Firm—Edward W. Somers

[57] ABSTRACT

An optical fiber cable closure (20) includes a cable termination assembly (22) and a cover (23) into which the termination assembly is inserted. The cable termination assembly includes two spaced end plates (34,36) through which cables (28,29) to be spliced extend. One of the end plates supports a frame (101) which supports a plurality of optical fiber splicing trays (120—120). Adjacent end portions of the trays are staggered and hinged so that some trays may be moved pivotally to expose others. Optical fibers from each incoming cable are routed in individual tubes (115—115) from an optical fiber breakout (110) mounted in the framework to selected ones of the trays. Hinge lock plates (130—130) which complete a hinge for each tray also serve to clamp the tubes incoming to each tray to prevent unintended movement.

22 Claims, 8 Drawing Sheets

OPTICAL FIBER CABLE CLOSURE

TECHNICAL FIELD

This invention relates to an optical fiber cable closure. More particularly, the invention relates to a closure for optical fiber cables which provides for enhanced optical fiber storage.

BACKGROUND OF THE INVENTION

The use of communication cables which include a plurality of optical fibers is rapidly expanding. An optical fiber cable may comprise a plurality of optical glass fibers each of which is protected by at least one layer of a coating material. The optical fibers may be assembled into units in which the fibers are held together by binder ribbons or tubes to provide a core. Another optical fiber cable core includes a ribbon type optical fiber arrangement in which a plurality, such as twelve fibers for example, are arrayed together side by side. A plurality of these ribbons may be stacked to obtai a high fiber count cable. The core is enclosed by a plastic core tube and a plastic jacket. Also, the cable may include metallic strength members or the cable may be all-dielectric. Optical fiber cables complete in a field where there has been long use of electrically conductive cables wherein communication channels have relied upon pairs of insulated wire-like metallic conductors or coaxial tubes within the cable.

Whatever the structure of the cable, there must be provisions for splicing transmission media at an end of a given length of cable to corresponding transmission media at an adjacent end of another length of cable. In wire-like metallic conductor communication practice, it is conventional to use a splice closure, within which strength members of the cable ends may be anchored and all conductors spliced, wrapped and stored and protected environmentally. During the splicing of metallic conductors, it is customary to bend the spliced connections, to provide access to other connections.

The physical nature of glass optical fibers forecloses the adoption of splicing techniques which are used with metallic conductors within such a splice closure. Because of their small size and relative fragility, optical fibers must be handled and stored in closures with special considerations. Transmission capabilities may be impaired if an optical fiber is bent beyond an allowable bending radius, the point at which light is no longer totally contained in the core of the fiber. Furthermore, fibers are brittle and their expected lives will be reduced if bent below the minimum bending radius. Generally, the radius to which the optical fibers can be bent without affecting orderly transmission is substantially greater than that radius at which the optical fiber will break. Whereas glass and silica, the materials used to make optical fibers, are in some respects stronger than steel, optical fibers normally do not possess this potential strength because of microscopic surface fractures which are vulnerable to stress and spread, causing the fiber to break easily.

As noted above, an optical fiber cable does not lend itself to the splicing practices of wire-like communication conductors. The individual glass fibers cannot just be bunched, tied, wrapped and moved into a splice closure, in anything like the manner of wire-like metallic conductor cables. These small diameter glass fibers cannot be crimped or bent at small angles, without breaking. Inasmuch as glass fibers have memory and tend to return to a straight-line orientation, placement in a splice closure becomes somewhat difficult. Moreover, the interconnection of optical fibers is a precision operation which in the past has tended to discourage some from performing splicing operations within a manhole, in a duct, or a pole-suspension elevation. And yet, to do otherwise becomes more expensive.

These problems are particularly acute in multifiber cables where individual optical fibers must be spliced in a manner which allows repairs and rearrangements to be made in the future. In addition, fiber slack normally must be provided adjacent to the splices. The need to store the slack further complicates the problem of providing a suitable optical fiber closure.

When splicing optical fibers by fusion or by mechanical means, it becomes necessary to provide enough slack fiber so that the fiber can be pulled out of the splice case for the preparation and joining together of fiber ends. This requires at least about 0.5 meter of fiber from each cable to be stored in the splice closure when the closure is sealed, that is when the splicing has been completed. For a multifiber cable there must be a method of storing this slack, of protecting the splice and of keeping the fibers together in an orderly manner. The splices should be easily accessible to facilitate the rearrangement of the optical fibers and splices.

Notwithstanding the above-enumerated problems, it becomes necessary to splie together the ends of optical fiber cables in field locations. A new closure is sought after to facilitate splicing in which suitable protection is afforded the optical fibers. Provisions must be included in the sought-after splice closure for holding mechanical splices as well as fusion splices.

Optical fiber splice organizers and splice closures have been proposed in the prior art. These prior art organizers and closures have suffered from a variety of shortcomings. Typically, they have been somwhat complex, difficult to use and difficult to access. Some the prior splice organizers have tended to place undue stresses on the optical fibers resulting in fiber damage. In addition, these prior art closures often have failed to provide simple to use, positive means for routing the optical fibers in an effective manner to the organizers and for storing slack.

For example, a splice closure with a central transverse bulkhead has been used. Individual fibers are spliced and are attached to the bulkhead for support. A disadvantage of this approach is the lack of facilities for the storage of slack in the fibers. In other splicing arrangements, all the optical fibers in a cable are looped within the same retainer or fiber slack is stored on spools. In either case, identification, repair or splice work of individual fibers is extremely difficult without a major rearrangement within the splice closure. This is undesirable because the transmission capability in active fibers can be afforded as they are moved.

In another closure of the prior art, there is provided a device for organizing a plurality of individual optical fibers or other similar type conductors or fibers at a slack or splice point. A device having modular construction is provided which is suitable for installation in standard splice closures. The device comprises a plurality of tray-like members each adapted to retain and store at least one fiber. The device provides access to the individual fibers contained in the trays. Each tray may be marked to identify individual fibers therein. The trays are stacked one on top of the other, and each is hinged separately at one side thereof to a carrier, thus allowing them to move relative to one another like bound pages. Each tray-like support has a width which is adequate to provide the minimum bending radius specified for the fiber.

In another prior optical fiber cable closure, organizer trays for the spliced optical fibers are hinged. Optical fiber transitions are anchored from each cable to a tray with a controlled bend radius. This arrangement provides ready access to in-service optical fibers without the risk of inadvertent bending of the fibers. However, the arrangement of optical fibers in a cable to different trays is somewhat cumbersome to carry out and there appears to be a lack of protection for the fibers in the transition from the cables to the trays.

What the prior art seemingly lacks is an optical fiber cable closure which p rovides enhanced access to optical fiber splice connections. Also, provisions must be made for ease of breakout of the optical fibers from an incoming cable to allow the rearrangent of fibers of one cable into groups and the connection of these groups to fibers of another cable which have been rearranged into groups as well as for their protection during the breakout.

SUMMARY OF THE INVENTION

The foregoing problems of the prior art have been overcome by an optical fiber cable closure of this invention. The closure includes a tubular cover having a closed end and an open end and a cable splicing termination assembly which is adapted to be received within the cover. The cable splicing termination assembly includes cable entry facilitates such as inner and outer end plates through which the cables to be spliced are routed. A support member extends from the cable entry facilities and has a free end disposed adjacent to the closed end of the cover and also has a plurality of pairs of opposed aligned hinge pins which are staggered in a direction from the cable entry means to the free end of the support member. The support member includes a support base for supporting an optical fiber breakout and a plurality of optical fiber splice trays. Pairs of the opposed hinge pins for the trays are maintained in engagement with the trays by hinge lock plates.

The closure includes provisions for causing the cover to be sealed to the inner and the outer end plates. The tubular cover having a open end and a closed end is moved over the trays and the end plates to have the periphery of the open end secured to the outer end plate and an inner periphery secured to the inner end plate.

Each of the trays includes an end portion which forms a portion of a hinge in which a pin extending inwardly from an outer wall of the support member is enclosed. A hinge lock plate which extends across and joins to each tray adjacent to an associated pair of pins extending inwardly from the support member traps the pins and completes the hinge.

After outer sheath components of cables which enter the closure are removed, the optical fibers and an enclosing core tube are directed to one end of an optical fiber breakout. The optical fibers extend into the breakout and at an opposite end are routed in tubes rearwardly and then upwardly to selected ones of the trays. The optical fiber breakout allows a user to separate optical fibers of each cable in to groups to be routed to one or more trays where optical fibers extending from one tube are spliced to optical fibers extending from another tube. Further, this is accomplished with the optical fibers in a transition zone between the cables and the routing tubes being protected.

The hinge lock plate has a dual function. Not only does it serve to complete a hinge mechanism for each tray, but also, advantageously, the hinge lock plate engages the tubes which enclose the optical fibers which are routed from the optical fiber breakout at the entrances of the tubes onto a particular tray. This prevents unintended movement of the optical fibers which could result in damage to the fibers. Also, it prevents transfer of undue forces to the splices which are supported in the tray.

BRIEF DESCRIPTION OF THE DRAWING

Other features of the present invention will be more readily understood from the following detailed description of specific embodiments thereof when read in conjunction with the accompanying drawings, in which:

FIG. 1, comprising FIGS. 1A and 1B, in an overall perspective view of a closure of the invention which includes a cable splicing termination assembly and a cover;

DETAILED DESCRIPTION

Referring now to FIGS. 1A and 1B, which hereinafter will be referred to as FIG. 1, there is shown an optical fiber cable closure which is designated generally by the numeral 20. The closure 20 includes a cable splicing termination assembly (see also FIG. 2) which is designated generally by the numeral 22 and in which optical fibers 21—21 (see FIG. 4) are spliced and/or stored and a cover 23. The cover 23 is cylindrically shaped and includes an open end 25 and a closed end 27. In order to assemble the cable splicing termination assembly 22 with the cover 23, the cable splicing termination assembly is inserted into the open end 25 of the cover and moved toward the closed end. Whereas the following description describes the splicing of two cables 28 and 29 (see FIGS. 2 and 3), it should be appreciated that the closure 20 can accommodate additional pairs of cables to be spliced or can be used to store optical fibers for future splicing to branch cables.

As also can be seen in FIG. 1, the cable splicing termination assembly 22 includes a cable entry portion 30 and optical fiber splice support means 32. The cable entry portion 30 includes two spaced end plates 34 and 36 each of which is disc-shaped with the end plate 34 being referred to as an outer end plate and the end plate 36 being referred to as an inner end plate. Each of the end plates 34 and 36 is made preferably of a molded plastic, glass-reinforced polypropylene. The two end plates 34 and 36 are held in assembled relationship spaced apart by a central stud 38 and three circumferentially disposed standoffs 39—39 which are molded integrally with the inner end plate 36. Each of the end plates is also provided with three oval shaped openings with those in the outer end plate 34 being designated 41, 43 and 45 and with those in the inner end plate 36 being designated 47, 48 and 49. Openings in the end plate 34 are aligned with associated ones of the openings in the end plate 36. The opening 41 is aligned with the opening 47, 45 with 48 and 43 with 49.

Disposed in the opening 43 is a grommet 50 (see FIGS. 1, 2 and 3) which is made of an elastomeric material. The grommet 50 includes two passageways 52—52 through which are destined to extend the cables 28 and 29 to be spliced. Similarly, a grommet 54 which is aligned with the grommet 50 and which includes two passageways 56—56 is disposed in the opening 49. Further, the grommet 50 is provided with openings 58—58 to allow passage through the grommet of a ground wire 59. Although two cables to be spliced are destined to extend through the passageways 52—52 and 56—56 of the aligned grommets 50 and 54, each ground wire 59 need only extend through the first grommet because it is terminated between the two end plates. Each of the openings 47, 48 and 49 of the inner end plate 36 has a rim 53 (see FIG. 2) thereabout on the inner side of the inner end plate. In this way, the grommets in the inner end plate are prevented from moving through the inner end plate.

Unless it is known from the outset that more than two cables are to be spliced in the closure 20, the other two sets of aligned openings in the end plates are plugged with dummy plugs 60—60. Advantageously, as more cables need to be spliced in the closure 20, one or both of the dummy plugs 60—60 is removed and replaced with a pair or pairs of grommets identical to the grommets 50 and 54.

Outboard of the outer end plate 34 is situated a retainer yoke 62 (see FIG. 1) which includes three equiangularly extending ribs 64—64. The central stud 38 which is secured to the end plates 34 and 36 extends through a central opening in the yoke and a knob 61 is turned onto the stud to hold the yoke secured in place. The yoke 62 functions to hold the plugs and grommets in place and to stabilize the closure structure. Each of the ribs 64—64 terminates in a cross-member 65 and includes two strain relief portions 63—63 which extend angularly therefrom. An end of strain relief portion is provided with a V-shaped configuration which is such that it provides support for any expected size cable to be spliced with the closure 20. Each entering cable is secured to an associated strain relief portion 63 by a cable tie (not shown). The ribs 64—64 as well as the strain relief portions 63—63 and cross members 65—65 extend for a distance of about 0.75 inch and intersect with a back-up plate 66. No matter which size cable of the expected range of sizes is routed into the closure, the cable engages one of the strain relief portions 63—63 outside the grommet and hence is prevented from bending excessively at the entrance to the grommet.

Further, between the yoke 62 and the end plate 34 are disposed three arcuately shaped members 67—67 each of which extends between two pins 68—68 (see FIG. 2) that extend perpendicularly to the yoke 62. The members 67—67 are effective to hold the grommets and plugs in place in the outer end plate 34.

Disposed between the end plates 34 and 36 are facilities for securing the cables 28 and 29 against unintended movement. The manner in which the cables between the two grommets is secured also is important. Suitable securing of the cables in this area will prevent undue forces from being transmitted past the inner grommet to the splice work. Assuming that each of the optical fiber cables includes a corrugated metallic shield 69 (see FIG. 3) an outermost plastic jacket, disposed about the corrugated metal shield, is removed from the cable to a point about midway between the grommets. A core tube 71 of the cable is caused to extend through the inner grommet 54 to the splice area. Also, a portion of the metallic shield 69 is removed so that only a relatively short length extends beyond the end of the plastic jacket.

Figure 2:
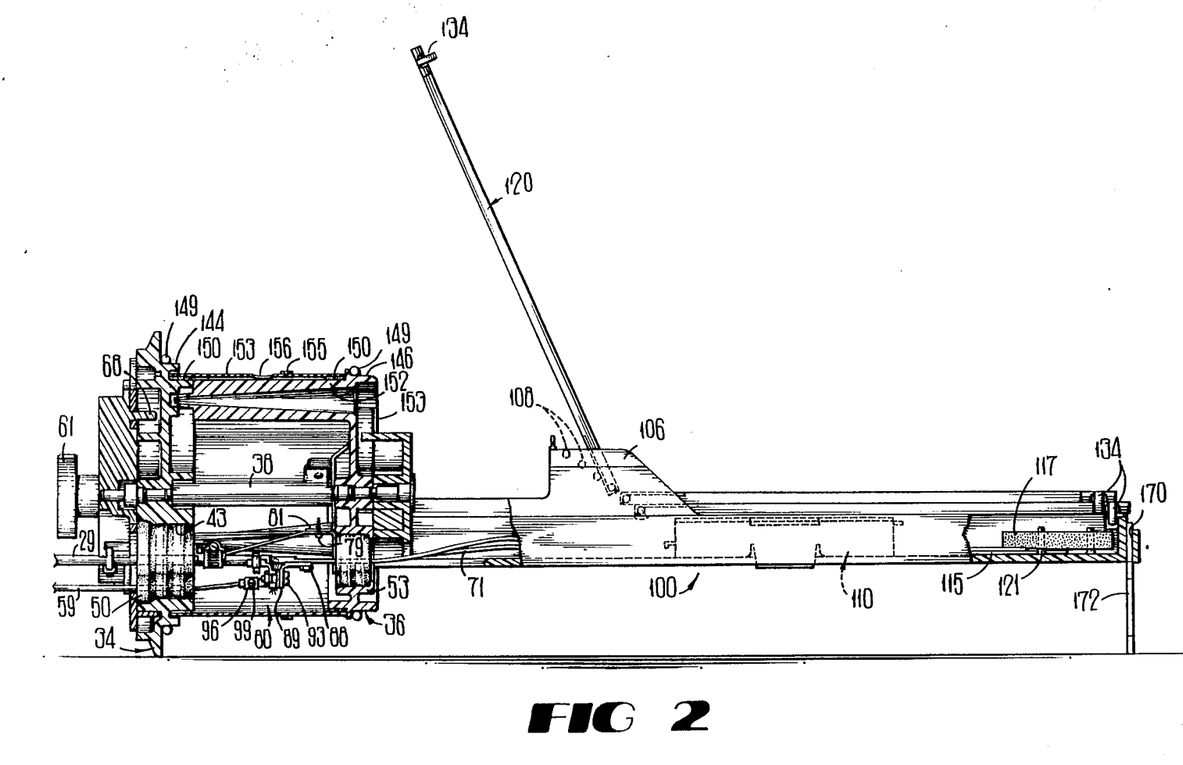
FIG. 2 is a side elevated view partially in section of the cable splicing termination assembly of FIG. 1.
Figure 3:
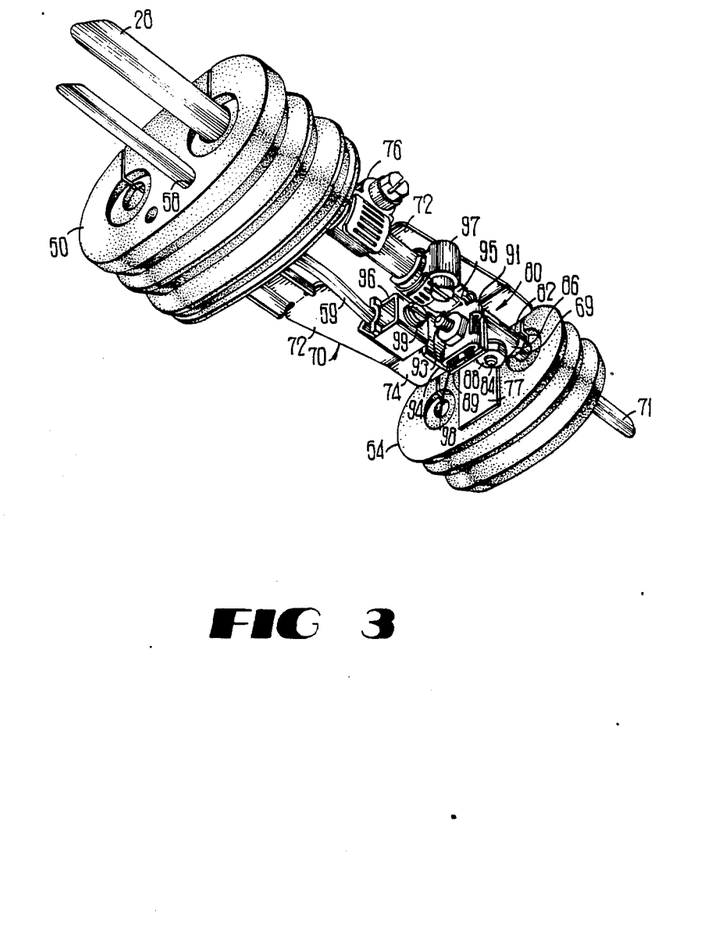
FIG. 3 is an enlarged perspective view of a cable entry portion of the cable splicing termination assembly of FIG. 1.

A bifurcated sheath grip 70 (see FIGS. 1-3) having two legs 72—72 and a cross member 74 is attached to the two cables, only one of which is shown in FIG. 3, adjacent to the outer grommet. Should any two aligned openings in the grommets not have a cable portion therein, a plastic rod is inserted between the grommets and into the openings so as to seal the two aligned openings. An adjustable band clamp 76 is disposed about each jacketed cable adjacent to the grommet 50 and connected to one of the legs 72—72. A bar 78 connects outer end portions of the two legs 72—72 and provides resistance to torsional forces imparted to the cables. A portion 77 depends outwardly from the cross member 74 adjacent to the inner grommet. A fastener 79 extends through the cross member 74 and attaches to an anchor 81 (see FIG. 1) between the two grommets. The anchor is secured to the inner end plate 36 by the central stud 38.

Also disposed between the end plates 34 and 36 is a bonding means 80 (see FIGS. 2 and 3). The bonding means 80 is adapted to engage that portion of the cable between the end plates 34 and 36 to estabish an electrical connection with metallic shields of the cables. The cables 28 and 29 to be spliced are caused to extend through the grommet 50 in the end plate 34 whereafter sheath components are removed to expose the metallic shield 69 of each. The bonding means 80 is attached to each cable to establish an electrical connection with the metallic shield of each after which a grounding wire 59 is connected to the bonding means and routed out of the closure 20 through an opening 58 in the grommet 50. The metallic shield is removed from an additional length of each cable to expose its core tube 71. The core tube is caused to be routed through the aligned opening 56 to the grommet 54.

Of course, should the cable 28 or 29 or both not include a metallic shield, bonding means beween the end plates 34 and 36 need not be provided. What is important to recognize is that the bonding of any metallic portions of the cables to be spliced is performed between the end plates, that is, in a different portion of the closure 20 than that in which the splicing of the optical fibers 21—21 is performed.

Each exposed portion of a metallic shield 69 which extends past a plastic jacket is caused to be disposed between a shoe plate 82 (see FIG. 3) having a threaded stud 84 upstanding therefrom and an outer bonding plate 86. The bonding plate 86 is held to the shield by a nut 88 which is turned onto the threaded stud 84. The outer bonding plate 86 includes a turned portion 89 which is secured to a turned portion 91 by a fastener 93. The turned portion 91 extends from a curved plate 95 which is secured to a cable jacket by an adjustable band clamp 97. Strength member wires, if any, of the cable disposed between the shield and the jacket, for example, may be secured to the turned portion 91. Disposed between the two turned portions 89 and 91 is an L-shaped grounding connector 98 having an end 94 secured in a barrel 96 by a screw 99. Disposed in engagement with the end 94 within the barrel 96 is a bared end portion of a ground wire 59 which extends through the outer grommet 50 and which external to the closure is covered with a plastic jacket. The ground wire is suitably grounded externally of the closure.

In using the closure 20, a craftsperson assembles the two cables 28 and 29 to be spliced to outer and inner grommets 50 and 54, respectively, and causes the metallic shield to be connected electrically to the grounding facilities 80. Then the craftperson removes a dummy plug, if necessary, from an opening in the outer end plate 34 and from an aligned opening in the inner end plate 36. Afterwards, the craftsperson inserts the two grommets 50 and 54 with the cable end portions extending therethrough into the openings in the end plates.

Figure 4:
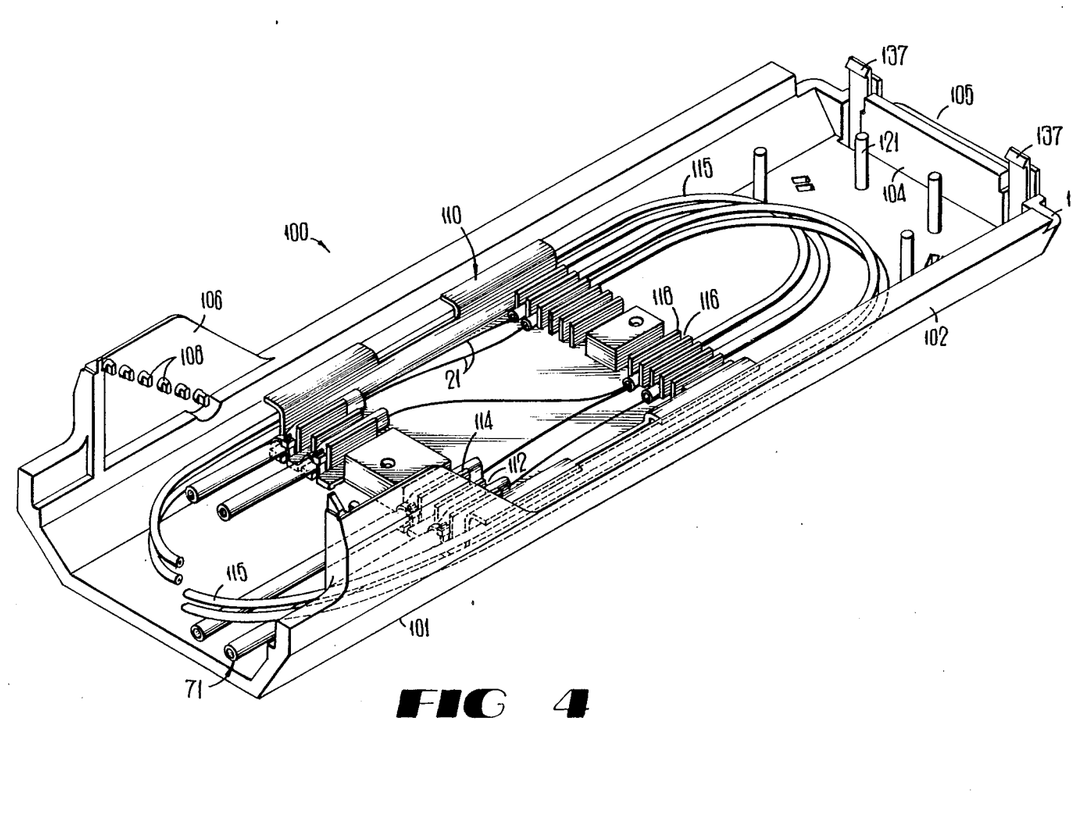
FIG. 4 is a perspective view of a portion of the cable splicing termination assembly to show an optical fiber breakout means.
Figure 4A:
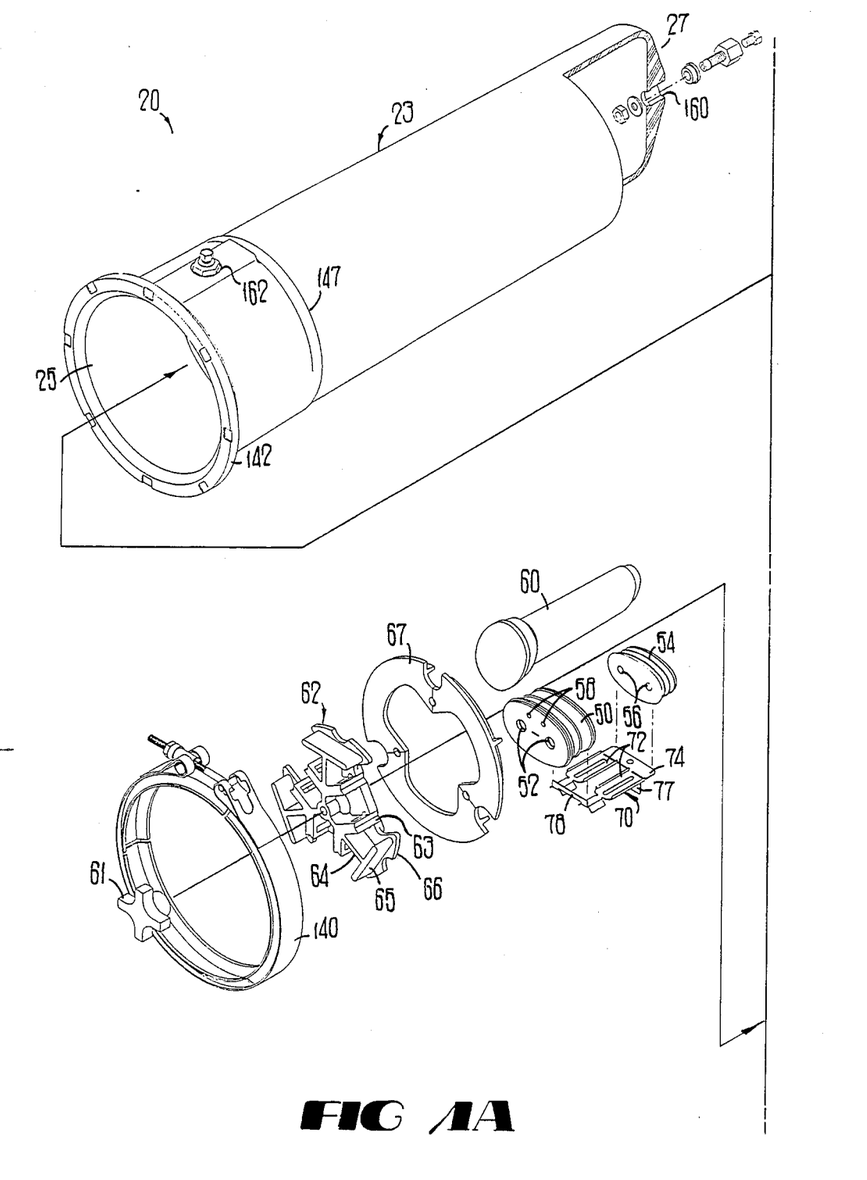
Figure 4B:
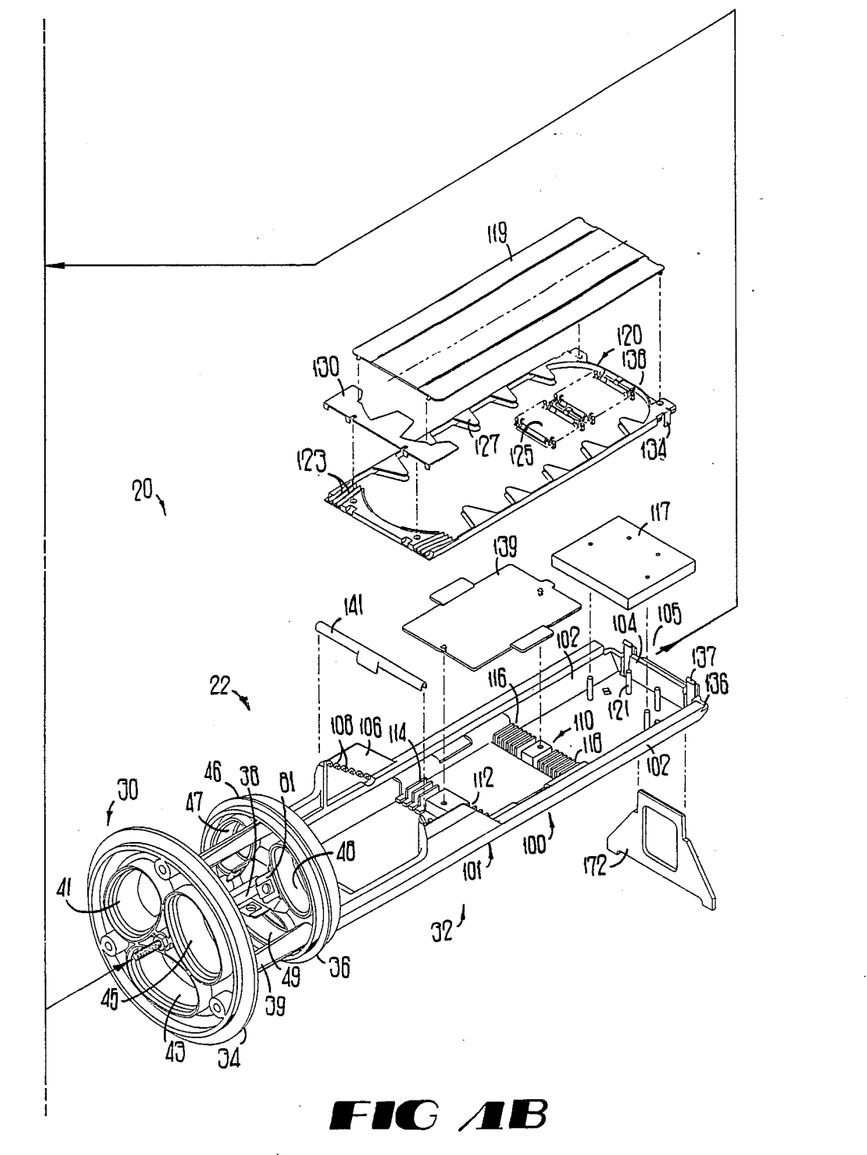

Cantilevered from the inner end plate 36 and the central stud 38 is a cable splice support assembly 100 (see FIGS. 1, 2 and 4). The assembly 100 includes a frame 101 which includes sidewalls 102—102 and an end dam 104 at a free end 105 thereof. Each of the sidewalls 102—102 includes a projecting wing portion 106 having a plurality of pins 108—108 extending inwardly and arranged in stairstep fashion along the projecting wing portion.

As mentioned hereinbefore, the portions of the optical fiber cables 28 and 29 which extend beyond the cable and plate 36 into the cable splice support assembly 32 have the shields and other sheath components removed therefrom. Only a core tube 71 of each cable extends through the end plate 36 and extends into engagement with an optical fiber breakout 110.

As can be seen in FIG. 4, the optical fiber breakout 110 is used to effect a transition between the plurality of optical fibers in a cable structure to a regrouping of optical fibers in one or more tubes outgoing from the breakout to a particular splicing area of the closure 20. Each core tube 71 of a cable is adapted to be received in a channel 112 formed between partitions 114-114 in one end of the fiber breakout. The core tube 71 is removed from the remaining length of the cable so that only the optical fibers of the cable extend beyond the channels 112—112 and into the breakout. Within the fiber breakout 110, the optical fibers are organized and inserted in predetermined groups into plastic routing tubes 115—115. The tubes 115—115 are arranged so that one end portion of each is received in a channel 116 formed between partitions 118—118 at the opposite end of the fiber breakout, that is the end oriented toward the free end 105 of the framework 101. A lid 139 (see FIG. 1) covers the breakout 110 to protect the bared, coated optical fibers 21—21 therein.

After the tubes 115—115 emerge from the channels 116—116, each of the tubes is routed in a retroflexed configuration and directed back toward the inner end plate 36. In that direction, the tubes 115—115 are destined to be secured to selected ones of a plurality of trays 120—120 on each of which the splicing is to be performed (see FIG. 5). Within the free end portion 105 of the frame 101 is disposed a foam pad 117 which is received over pins 121—121 to cushion fibers or fibers which are stored in loops between the breakout 110 and the free end 105 during handing (see FIG. 2).

The trays 120—120 (see also FIG. 5) are mounted pivotally to the frame 101 and are adapted each to hold a plurality of spliced optical fiber portions. Advantageously, each tray 120 is made of a plastic material such as polycarbonate, for example and is adapted to be mounted pivotally on a pair of the opposing pins 108-108. In order to accomplish this, that end of each tray which is to be mounted adjacent to the end plate 36 includes a portion 122 having a radiused cut-out 124 (see also FIG. 6). As such, the cut-out 124 forms partially an enclosing member for the opposed pins 108—108. Also, the portion 122 of the tray 120 includes a plurality of entrance channels 123—123 which are formed between partitions 126—126 or between the partitions and a sidewall.

Figures 5, 6:
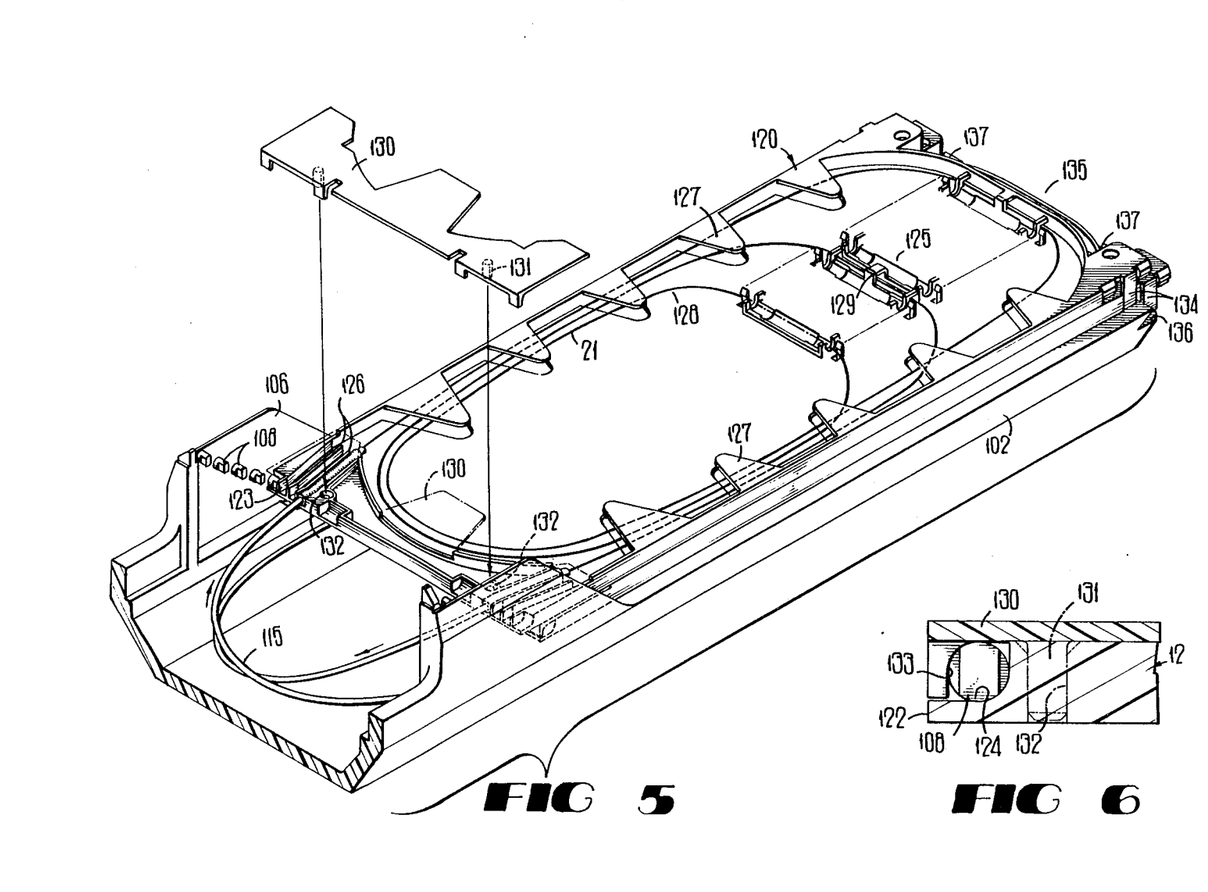
FIG. 5 is a perspective view of a tray on which regrouped optical fibers of cables can be spliced.
FIG. 6 is an enlarged view of a hinge portion of a tray and of a hinge lock plate of the closure.

Each tray 120 also includes a plurality of nests 125—125 for holding spliced portions of pairs of optical fibers. The optical fibers may be spliced by fusion or may be spliced by a splice connector such as a rotary mechanical splice connector such as is shown in U.S. Pat. No. 4,545,644 which issued on Oct. 8, 1985 in the names of G. F. DeVeau, et al. In each tray 120, excess lengths of each pair of spliced fibers may be looped within the tray as indicated by the numeral 128 and secured within clips 129—129 which are disposed between groups of the nests.

Further, each tray 120 includes a plurality of overhanging portions 127—127. Optical fibers extending from the tubes are routed under these portions 127—127 before being turned in toward one of the nests 125—125 for splicing.

Each tray 120 also has associated therewith a hinge lock plate 130 (see FIGS. 1, 2 and 5). The hinge lock plate 130 spans across the tray at the optical fiber entrance end and includes a pair of detents 131—131 which are received in openings 132—132 in the tray. The opposite end of the hinge lock plate 130 which is adjacent to the hinged end of the tray includes a radiused cut-out 133 (see FIG. 6). When the hinge lock plate 130 is assembled to a tray 120, the radiused cutout 133 cooperates with the radiused cutout 124 of the tray to trap a pair of opposed pins and to complete a hinge. The hinge facilitates the pivotal movement of the tray.

The hinge lock plate 130 has a dual function. Not only does it complete a hinge for its associated tray 120, but also it secures incoming tubes 115—115, which contain optical fibers, within the tray. At the hinged end of the tray 120, it will be recalled that tubes 115—115 in which are disposed optical fibers and which have been routed from the optical fiber breakout extend through channels 123—123 into the tray splice ara. Advantageously, the hinge lock plate covers these channels thereby securing the tubed fibers against unintentional movement.

Each tray 120 also includes a pair of detents 134—134 which depend from an end 135 of the tray and depend from that side of the tray opposite to that on which the nests 125—125 are mounted. These detents are adapted to become disposed in recesses 136—136 formed in the frame 101 or to snap lock to an underlying tray. As the innermost tray 120 is positioned in the frame 101, resilient latches 137—137 of the frame (see FIGS. 1 and 4) snap into position over an end surface 138 of the tray to hold that tray secured to the frame. Then, as each successive tray is mounted to the frame 101, its detents snap-lock over an inner surface of the previously mounted tray to hold the successive tray to the preceding tray. In use, each tray is to be released from an underlying tray before it is turned pivotally to expose the splices supported on the underlying tray.

What is significant is that the design of the closure of this invention allows for the protected transition of optical fibers 21—21 as grouped in a cable to be rearranged into groups in tubes 115—115 that are then routed to splicing trays 120—120 where they are to be spliced to another regrouped plurality of optical fibers. The transition is caused to occur within the optical fiber breakout 110 thereby protecting the optical fibers 21—21 from inadvertant damage.

After the splicing has been accomplished as described earlier herein, the craftsperson causes a cover 119 (see FIG. 1) to be applied over the outermost tray 120 and a spreader bar 141 to extend between pins 108—108 of the next successive set of pins beyond the outermost tray. The spreader bar 141 helps to stabilize the wing portions 106—106. Then the craftsperson assembles the splicing termination assembly 22 to the cover 23. The termination assembly 22 is inserted into the cover 23 and a clamping band 140 is caused to be disposed about a rim 142 of the cover and the outer end plate 34. The clamping band 140 is caused to be secured about the cover and the end plate to secure them together and to hold the termination assembly in the cover 22.

Each of the end plates cooperates with the cover 23 to seal the closure against the unintended ingress of contaminants. The outer end plate 34 is provided with a rim 144 and the inner end plate 36 is provided with a rim 146 (see FIG. 2). Over each of the rims prior to assembly of the termination assembly 22 and the cover is placed an O-ring 149 which is made of a compliant sealing material. The cover 23 is formed with a step 147 (see FIG. 1) which upon assembly cooperates with the O-ring 149 to provide a seal about the inner plate 36. Also upon assembly, the cover 23 cooperates with the O-ring about the outer end plate 34 to provide an additional seal.

Figure 7:
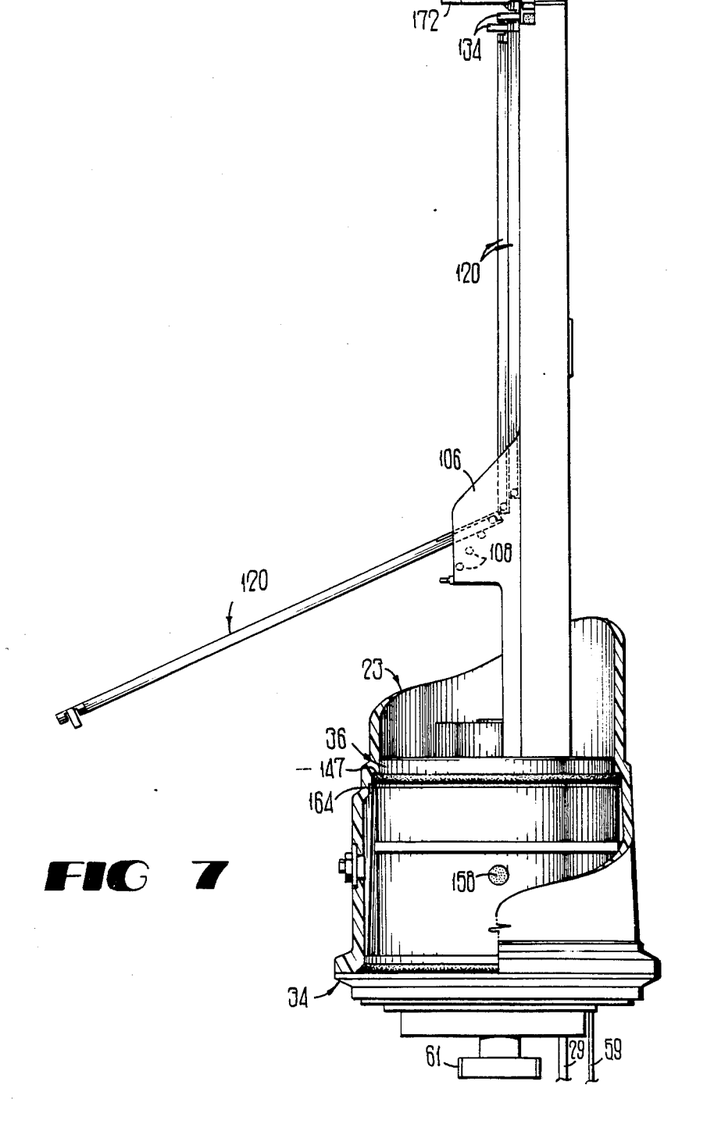
FIG. 7 is a side elevational view of the closure of FIG. 1 when oriented vertically.

If desired, the closure 20 may be filled with a suitable encapsulant such as EZ Entry encapsulant which is marketed by AT & T. As shown in FIG. 2, two foamed plastic seals 150—150 are placed in the cable entry portion, one over a rim 152 of the inner end plate 36 and one about the inner side of the outer end plate 34. Then a sheet 153 of plastic material is caused to span between the two end plates and wrapped thereabout. Three retaining bands 155—155 are used to secure the sheet of plastic material in place. A suitable encapsulant is introduced through a port 156 into the volume formed by the sheet 153 and the end plates, and afterwards, the port 156 is closed with a plug 158 (see FIG. 7).

Also, after the closure 20 has been assembled, the closure may be pressure-tested at 69 kPa to determine if it leaks. This is accomplished by introducing a pressurized gas. Two ports may be provided to introduce the pressurized gas, one designated 160 and located at the closed end of the cover and another designated 162 and located between the two end plates (see FIG. 1). Precautions must be taken in order to prevent accelerated movement of the cover 23 from the termination assembly 22 should any pressure exist when the clamping band 140 is removed to reenter the closure. A plurality of pressure relief grooves 164—164 (see FIG. 7) are provided along an inner surface of the cover adjacent to the step 147 that cooperates with the inner end plate to provide a seal. These relief grooves also are of help when the termination assembly 22 is inserted into the cover 23. Upon insertion, pressure tends to build up and make assembly difficult. With the grooves, it has been found that resistance is encountered only during the last fraction of an inch of movement.

Also provided are facilities for positioning the closure 20 for splicing operations. An end of the termination assembly 22 is provided with a slotted opening 170 to receive an end of a support foot 172 (see FIGS. 1, 2 and 3). After the support foot is inserted into the opening, the support foot may be placed in engagement with any flat or substantially flat surface to cooperate with the outer end plate 34 stabilize the termination assembly 22 so that splicing can be performed. When not being used, the foot 172 may be stored in an opposite end at the opening and protrude into the cover for future use.

It is also important to recognize the versatility of the closure of this invention. In its normal usage, the closure is disposed with its longitudinal axis generally horizontal. However, the closure also may be used such that its longitudinal axis is oriented substantially vertically. As such, the closure resembles a pedestal. In this latter orientation, the cable entry end and the grommets are adjacent to the ground for example, and the free end of the frame 101 is oriented upwardly.

When splicing is to be accomplished with the closure being oriented vertically (see FIG. 7), the trays must be rearranged. Otherwise, the splices would be supported on that side of each tray which is oriented downwardly when the tray is moved pivotally to expose the next successive inner tray. In order to have the splices be supported on that side of the tray which is oriented upwardly when said tray is turned through an obtuse angle before coming to rest in engagement with a pair of the pins 108—108 which serve as stops, each tray is inverted from its prior position. In other words, it is turned over so that each hinge lock plate 130 is oriented toward the frame 101. Whereas before each hinge lock plate 130 was assembled to a tray 120 with the tray extending along the frame 101, with the closure in the vertical position, the trays must be in a near horizontal position turned from the frame to allow the hinge lock plates to be assembled thereto. Also in the vertical orientation, the cover 119 must be attached to the innermost tray.

Figure 8:
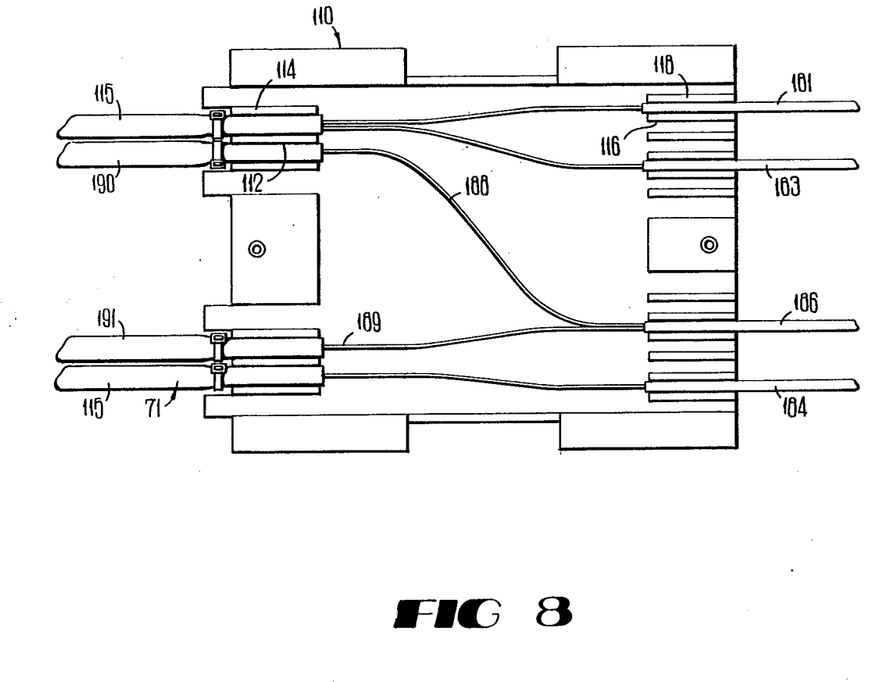
FIG. 8 is a schematic plan view to show routing of cables and optical fibers in a typical splicing arrangement.

Viewing now FIG. 8, there is shown a schematic plan view of the optical fiber breakout 110 to depict one of the advantages of the closure of this invention. Optical fibers in an incoming cable may be regrouped or regrouped with fibers from another incoming cable and routed out of the breakout in plastic tubes which hold the new groupings. These tubes are routed to trays where they are spliced to optical fibers which enter each tray in tubes that contain regrouped optical fibers of an outgoing cable.

For example, in FIG. 8, optical fibers disposed in a core tube 71 of an incoming cable 28 are regrouped and routed out of the breakout 110 in two tubes 181 and 183. The tube 181 is directed to a first tray and the tube 183 to a second tray. On the first tray, optical fibers in the tube 181 are spliced to optical fibers in a tube 184 which has been routed to the first tray from the breakout 110 and which have been regrouped from the core tube 71 of an outgoing cable 29. Also, on the second tray, optical fibers in the tube 183 are spliced to optical fibers extending from the tube 186 which contains a regrouping from the outgoing cable 29 and which is routed from the breakout 110. As can be seen in FIG. 8, optical fibers 188 and 189 from the tube 189 also may be routed in the breakout 110 to branch cables 190 and 191, respectively.

Further, the closure 20 may serve to store optical fibers of a cable which subsequently may be used for branch out purposes in the loop, for example. A cable is directed into the closure, sheath components are removed and predetermined optical fibers severed and stored for future use. The same cable is directed out of the closure with portions of the cut fibers therein. Or a cable may be extended into the closure with its core tube 115 entering the breakout 110 and fibers from the core tube directed out of the closure from the other side of the breakout. A suitable length portion of the optical fibers are looped around the pins 121—121 under the foam pad 117 and stored for future use.

It is to be understood that the above-described arrangements are simply illustrative of the invention. Other arrangements may be devised by those skilled in the art which will embody the principles of the invention and fall within the spirit and scope thereof.

We claim:

1. An optical fiber cable closure, said closure comprising:
   a cover having a closed end and an open end; and a cable splicing termination assembly which is adapted to become disposed within said cover, said cable splicing termination assembly including:
   cable entry means through which cables to be spliced are routed into said closure;
   support means which extends from said cable entry means and which has a free end adapted to be disposed adjacent to said closed end of said cover, said support means including a plurality of pairs of opposing, aligned pins which pins are staggered in a stepped manner and in a direction from said cable entry means to a free end of said support means;
   at least one tray which is mounted pivotally on said support means for holding spliced portions of optical fibers, each of said trays cooperating with an associated pair of said pins forming partially a hinge and including means for holding spliced portions of fibers;
   hinge lock plate means removably attached to one end of said at least one tray for completing said hinge means for each said tray and being removable to permit optical fibers from at least one entering cable to be routed into each said tray, said hinge lock plate means also cooperating with a portion of said at least one tray to prevent unintended movement of optical fibers at an entrance to said at least one tray.

2. The optical fiber cable closure of claim 1, wherein said closure includes a plurality of trays and also includes optical fiber breakout means into which optical fibers from each cable to be spliced extend for facilitating the transition between optical fibers as grouped in the cables to be spliced and groups of fibers to be spliced on said trays, and out of which extend a plurality of tubes, each said tube having at least one optical fiber disposed therein and extending from said optical fiber breakout into a tray.

3. The optical fiber cable closure of claim 2, wherein each said tube extends from said optical fiber breakout means into an entrance channel of one of said trays with optical fibers disposed within each said tube extending from said entrance to said means for holding spliced portions of the fibers.

4. The optical fiber cable closure of claim 3, wherein said hinge lock plate means which is connected removably to each said tray means is effective to hold each said tube at its entrance to a tray in said tray and to prevent unintended movement of the portion of the tube which extends through the entrance portion of said tray, said hinge lock plate also being effective to lock said tray to pair of opposed pins.

5. The optical fiber cable closure of claim 4, wherein each of said tubes extends outwardly from an end of said fiber breakout means which is oriented toward the free end of said support means and is routed in a retroflexed configuration toward said cable entry means.

6. The optical fiber cable closure of claim 2, wherein each of said trays may be mounted pivotally to said support means with said means for holding the spliced portions of the optical fibers on each of said trays facing said optical fiber breakout means.

7. The optical fiber cable closure of claim 2, wherein each said tray may be mounted pivotally to said support means with said means for holding the spliced portions of the optical fibers on each said tray facing away from said optical fiber breakout.

8. The optical fiber cable closure of claim 2, wherein said means for holding spliced portions of the optical fibers includes a plurality of nests.

9. The optical fiber cable closure of claim 2, which includes a hinge lock plate associated with each said tray and wherein each said hinge lock plate includes at least one deformable detent depending therefrom and received in an opening which is formed in the associated tray.

10. The optical fiber cable closure of claim 9, wherein each of said trays includes a plurality of channels formed at a fiber entrance end thereof and being disposed on the same side of said tray on which said nests are formed.

11. The optical fiber cable closure of claim 2, wherein said optical fiber breakout means includes a plurality of channels oriented toward said cable entry means for receiving and holding portions of said incoming cables and a plurality of channels at that end of said breakout means oriented toward said free end of said support means for receiving and holding the tubes in which are disposed the optical fibers and which are routed to selected ones of said trays.

12. The optical fiber cable closure of claim 2, wherein said closure includes a plurality of trays with each of said trays including a plurality of portions overhanging that side on which is disposed a plurality of nests for receiving spliced portions of the optical fibers, the overhanging portions serving to hold optical fibers which are routed between the overhanging portions and a base of the tray.

13. The optical fiber cable closure of claim 2, wherein said cable entry means includes a pair of spaced apart inner and outer end plates, each of said end plates having at least one opening therein to permit a cable end portion to extend therethrough, said end plates being spaced apart by a plurality of standoffs, said end plates and said standoffs being held together by a centrally disposed stud which extends through said end plates.

14. The optical fiber cable closure of claim 13, which also includes a bifurcated sheath grip disposed between said two end plates and having an end adjacent to said inner end plate attached to said stud and having each of two legs adjacent to said outer end plate attached to an incoming cable with outer end portions of said two legs being connected by a torsion bar to resist torsional forces applied to said cables.

15. The optical fiber cable closure of claim 13, wherein each of said end plates includes at least one opening in which there is disposed a removable plug such that a removable plug in one end plate is aligned with a removable plug in the other end plate.

16. The optical fiber cable closure of claim 15, wherein each of said openings in each of said end plates is capable of receiving a grommet having openings through which cables extend, said inner end plate having rims on an inner side thereof about each said opening to retain said grommet therein.

17. The optical fiber cable closure of claim 16, wherein said closure also includes three arcuately disposed portions adjacent to an outer surface of said outer end plate and held in engagement with said outer end plate by a yoke having three radially extending fins and a central opening through which said centrally disposed stud extends, said arcuately disposed portions spanning across any grommets disposed in said outer end plate to hold any such grommets in said outer end plate.

18. The optical fiber cable closure of claim 17, wherein each said radially extending fin includes a strain relief member projecting angularly therefrom toward an opening in an associated grommet through which a cable extends such that any cable in a range of sizes is supported by said strain relief portion.

19. The optical fiber cable closure of claim 18, wherein said closure includes a securing knob adapted to be turned onto a threaded end of said centrally disposed stud to hold said yoke and said arcuate portions assembled to said end plates.

20. The optical fiber cable closure of claim 13, wherein said cover is adapted to become disposed in sealing engagement with said end plates, and said closure includes a clamping ring adapted to be disposed about an end periphery of said cover and said outer end plate to hold said cover secured to said cable termination assembly.

21. The optical fiber cable closure of claim 20, which also includes facilities disposed between said two end plates for providiing a chamber into which an encapsulant may be introduced.

22. The closure of claim 20, wherein said cover is provided internally with a step which is adapted to engage a sealing member disposed about said inner end plate when said termination assembly is inserted into said cover to seal said closure and wherein an inner surface of said cover is provided with a plurality of pressure relief grooves adjacent to an outer side of said step.

* * * * *